RADIO OBSERVATION APPARATUS UTILIZING A RETURN BEAM

Filed Nov. 6, 1967 2 Sheets-Sheet 1

INVENTOR
Werner Veith

BY Hill, Sherman, Meroni, Gross & Simpson
ATTYS.

INVENTOR
Werner Veith
BY Hill, Sherman, Meroni, Gross & Simpson
ATTYS.

United States Patent Office 3,473,162
Patented Oct. 14, 1969

3,473,162

RADIO OBSERVATION APPARATUS UTILIZING A RETURN BEAM

Werner Veith, Munich, Germany, assignor to Siemens Aktiengesellschaft, a corporation of Germany Filed Nov. 6, 1967, Ser. No. 680,791
Claims priority, application Germany, Nov. 9, 1966, S 106,908
Int. Cl. G01s 7/04
U.S. Cl. 343—17 11 Claims

ABSTRACT OF THE DISCLOSURE

A method and apparatus for radio observation by means of a return beam for rendering objects visible by television transmission utilizing a millimeter wave signal, particularly for aircraft, wherein the space to be viewed is scanned line by line by a substantially point-shaped source of millimeter wave radiation, in the manner of a television raster, and in which the reflected millimeter wave signals produce a picture of the space to be viewed through means customary in television engineering, in which an antenna arrangement is provided for focusing and moving the millimeter wave signal to be transmitted in the line direction, which antenna is fed with a millimeter wave oscillation monotonically frequency-modulated with the period of the line duration, the antenna arrangement having a row of radiators, disposed on the axis of a parabolic cylindrical antenna, and spaced apart a distance of one half wavelength of the signal to be transmitted, the millimeter wave signal being continuously fed to the radiators of the row with a phase difference of about $2\pi$ or an integral multiple thereof varying with the frequency of the signal.

THE DISCLOSURE

The invention relates to an apparatus for radio observation with the use of a return beam for rendering objects visible by television transmission utilizing a millimeter wave signal, particularly for aircraft, whereby the space to be viewed, is scanned line by line by a substantially point-shaped source of millimeter wave radiation, along the principles of a television raster, and in which the reflected millimeter wave signals produce a picture of the space to be viewed with means customary in television engineering.

For automatic instrument flying, as well as for many other purposes, there exists the desire to see the range of vision lying before an observer in a cloudy atmosphere as well as under good visibility conditions. To accomplish this, it is common practice to employ millimeter oscillations and, by means thereof, to transmit by television transmission a video representation of the objects which, because of haze, mist, etc., cannot be seen directly. (See, for example, German Patents 727,303 and 1,076,204.)

A satisfactory solution for rendering objects visible thus far has not been found in the arrangements known in the prior art, because in order to render objects visible by television transmission they must be scanned dot by dot. Scanning by means of antenna systems employed in radar technology along the principles of German Patent 702,686 is out of the question, since they cannot be moved sufficiently rapid. To overcome this difficulty, the production of the desired television picture of the space to be viewed by means of a target electrode is known through the aforementioned German Patent 727,303, wherein such electrode is subdivided into a number of single elements corresponding to the picture points and which screens the energy of the millimeter wave transmitter, up to the energy of the element about to be scanned, from the receiver. The target electrode consists of a field in the form of a mosiac containing many elements, e.g., trigger tubes, whose potential distribution is converted into a visible picture. However, such an arrangement has not proved to be practical, because the production of the target electrode necessitates an extremely high technical expenditure even if resolving power attained merely approaches suffering.

Contrary to the last-mentioned arrangement, wherein the energy of all picture points, up to the energy of the picture point to be scanned, is screened from the receiver, the present invention, similarly to a known television pick-up method, employes as a basis the floodlighting of the objects to be reproduced dot by dot in the form of line-scanning patterns and registers the reflected radiant energy in chronological sequence by means of a simple antenna. This energy is then fed over a video amplifier to a suitable television apparatus. The objects to be reproduced are floodlighted by means of a millimeter wave signal because, as commonly known, a good resolution of the objects to be reproduced cannot be accomplished with longer waves and use of shorter waves creates a risk of absorption and scattering due to rain and snow flurries. The main problem in the use of such a method resides in the fact that a point-shaped source of millimeter wave radiation is required which moves very rapidly in the line direction of the television raster, The above problem cannot be solved through prior arrangements known in radar technology The invention, therefore, proposes that in an apparatus for radio direction finding by return beam of the type initially mentioned, an antenna arrangement be employed for focusing and moving the millimeter wave signal to be transmitted in the line direction, which is fed by a millimeter wave oscillator strictly monotonically frequency-modulated with the period of a line duration. Such antenna arrangement contains a row of radiators which are spaced by a half wave-length of the signal to be transmitted and disposed on the axis of a conventional parabolic cylindrical antenna, to which radiators the millimeter wave signal from the oscillator is continuously fed with a phase difference in the row of about $2\pi$ or integral multiples varying with the frequency of the signal The principle of focusing of the millimeter wave signal in a plane, proposed by this invention, is taught by the decimeter-telecommunication technique know under the "phased array." A fairly large number of spot radiators are strung in a line, whereby the distance of the radiator centers from one another equals $\lambda/2$. When power is fed into the radiators such that the phase difference equals $2k\pi$ ($k$ being equal to 0, 1, 2, . . .), if the number of such radiators is sufficiently large, the intensity of the radiation in all directions, apart from the intensity which is at right angles to the row of radiators, is then cancelled through interference. In this manner, a focusing of the beam in a very definite direction is accomplished without additional focusing elements (mirrors or lenses). The phase difference with which the individual radiators are fed, in accordance with an arrangement of the inventor, is now altered and, consequently, the direction of the transmitted radiation is shifted from the line perpendicular to the row of radiators. When a radiator configuration thus operated is arranged along the axis of a parabolic cylindrical reflector, which focuses the radiation in a second direction, a sharply focused lobe (the diameter of which is about as large as the antenna opening) is obtained, which is swingable or steerable in one direction (the line direction) by varying the phase difference of the energy fed into the radiators.

The principles of the invention may best be understood by a reference to the schematic figures of the accompanying drawing, wherein like reference characters designate like or corresponding parts, and in which.

Figure 1:
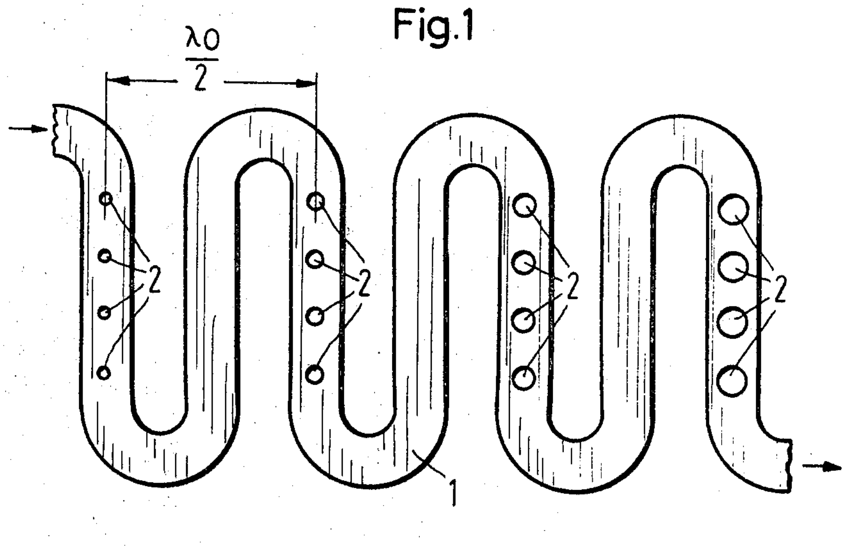
FIG. 1 is a plan view of a serpentine-shaped wave guide.

FIG. 1 illustrates in principle the construction of a phased-array configuration for millimeter waves which is specially arranged for effecting a swinging of the millimeter wave signal. For this purpose, the invention provides a serpentine-shaped hollow waveguide 1, the period $p$ of which equals half the wavelength $\lambda_0$ and whose electrical length per period equals an integral multiple of the center wavelength $k\lambda_0$ of the millimeter wave signal. At distances of a period, the hollow waveguide is provided with rows of coupling apertures 2, from which energy is coupled out. The condition, namely that the electrical length of the serpentine-shaped hollow waveguide equals $k\lambda_0$, assures the feeding of the single radiators (radiating rows of coupling apertures) in proper phase relation in the manner of a phased-array arrangement. For a millimeter wave with a wavelength of $\lambda_0$ fed into the serpentine-shaped hollow waveguide, with the phase difference of two successive single radiators being $2k\pi$, the radiated millimeter signal is focused in a plane a right angles to the axis of the serpentine-shaped hollow wavegudie. When the frequency of the millimeter wave transmitted sweeps through around the middle frequency $f_0=c/\lambda_0$ ($c$ being the velocity of light), the phase positions of the single radiators and, consequently, the direction of the plane in which the radiated signal is focused, are altered. The larger $k$ becomes, that is, the more wavelengths of the millimeter wave signal found along a cycle of the serpentine configuration, fewer frequency changes take place, with certain phase mistuning of the radiation which is coupled out from adjacent coupling rows and, consequently, a certain deflection from the perpendicular line, is accomplished. Through a correspondingly high value of $k$, not only is the tuning range of the millimeter wave oscillator kept within bounds, but also the deflection of the fixed radiator distances $p$ from the middle half wavelength $\lambda/2$ of the respective signal to be transmitted. This deflection, namely, affects the focusing of the lobe in the number of single radiators, which is always finite.

In order to maintain the energy radiated by each row of coupling apertures constant despite the decrease of the HF power of the signal fed in along the serpentine-shaped hollow waveguide due to coupling out, the diameters of the apertures of the individual rows of coupling apertures are continuously increased in the travel direction of the wave.

Figure 2:
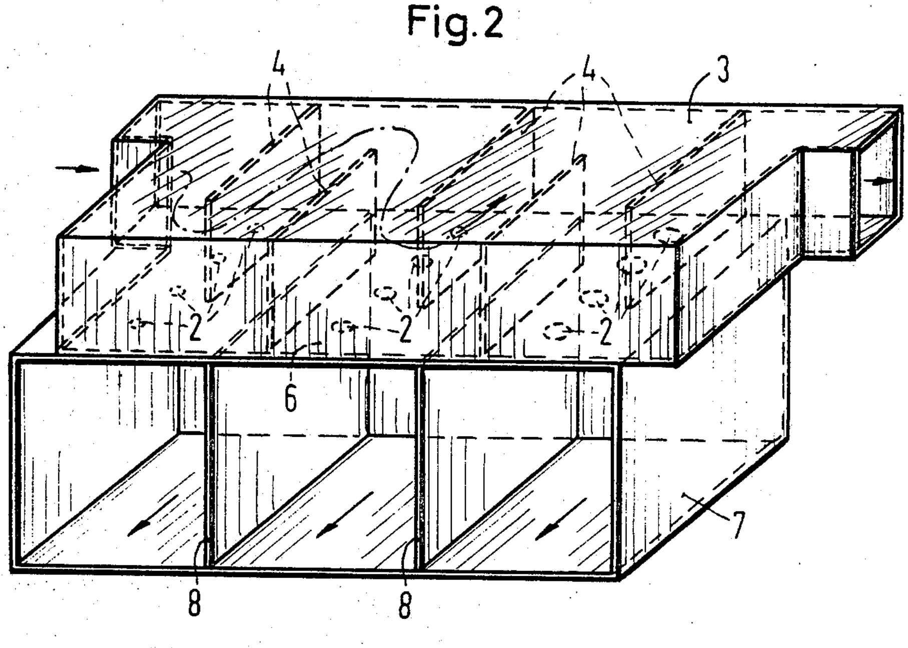
FIG. 2 is a perspective view of a rectangular shaped wave guide embodying the features of FIG. 1.

FIG. 2 illustrates an embodiment of the arrangement shown in FIG. 1. The serpentine-shaped hollow waveguide is here constructed as an elongated rectangular hollow waveguide 3 which is provided with interdigital line-defining intermediate partition walls 4 space at $\lambda_0/4$, and with coupling apertures 2 in the wall 6 thereof, which the serpentine-shaped hollow waveguide has in common with a hollow waveguide 7 which radiates the high frequency outwardly. Such second hollow waveguide 7 is subdivided by parallel partitions 8 respectively centered between respective adjacent rows of coupling apertures, whereby the chambers thus formed preferably open in a plane at right anglers to the common wall 6 of the two hollow waveguides 3, 7 and form the radiating apertures therewith.

According to an embodiment of the present invention, the radiation emanating from the phased-array arrangement is focused to a lobe by a parabolic cylindrical antenna. This lobe, which is swingable in the direction of the row of radiators (the line direction), must likewise be movable across the line direction for scanning the space to be sighted. For this transverse deflection, only a comparatively slow motion is required, so that the latter can be effected by means of a mechanical deflection system. Since it is possible that the parabolic cylindrical antenna may be titled from time to time, a rotating-mirror system for microwaves is preferably provided, but there is the disadvantage that such a rotating-mirror system requires a fairly large space, particularly if it can be inserted in the beam path only at a later stage, where the energy flow already takes up a great deal of space. Therefore, an advantageous further development of the invention utilizes a horn parabolic mirror, known per se, instead of a simple parabolic cylindrical antenna.

Figure 3:
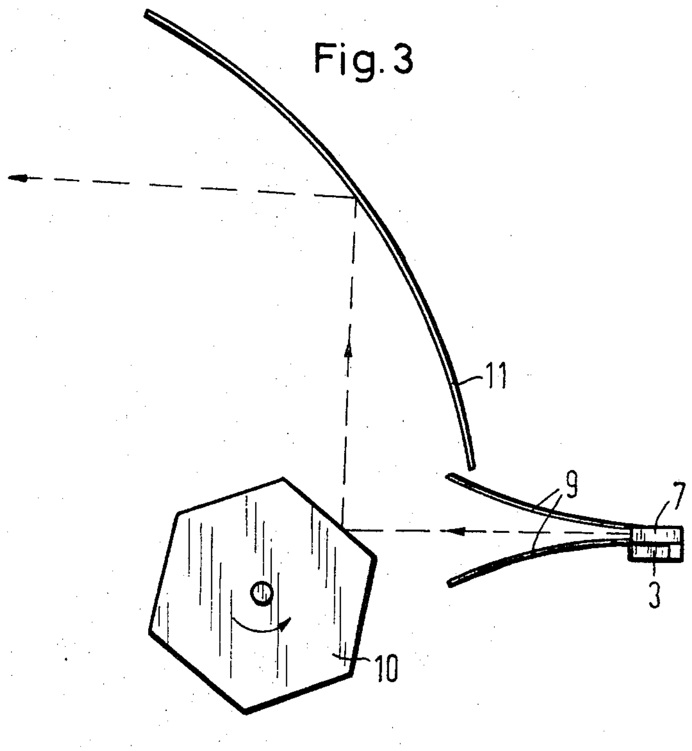
FIG. 3 is a sectional view of a wave guide such as illustrated in FIG. 2, with a parabolic cylindrical reflector and cooperable elements.

FIG. 3 is a sectional view of a corresponding embodiment of the invention. In this construction the radiation hollow waveguide 7 fed by the serpentine-shaped hollow waveguide 3, is provided with a horn 9 which prefocuses the millimeter wave radiation, initially focused in the direction of the row of raidators, in the direction perpendicular thereto. The total energy flow is then guided over a small, for example, hexagonal, rotating-mirror system 10 on to a parabolic mirror 11, which assures that the millimeter wave radiation is likewise radiated in sharp beams in the direction perpendicular to the row of radiators.

The rectangular area traversed by its beam movement is reproduced over the receiving antenna as a rectangular area which is much larger than the detection area that can be utilized. This is another way of stating that the receiving mirror or horn can yield only a very narrow lobe with a given antenna gain, or that it can receive the full intensity from a very limited direction.

Figure 4:
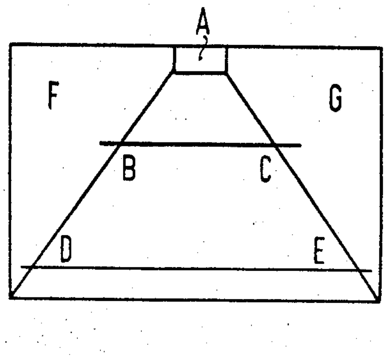
FIG. 4 is a diagram of the picture area obtainable from apparatus, constructed in accordance with the invention.

FIG. 4 represents a diagrammed picture area derived from an observation apparatus embodying the invention. According to the invention, the receiving antenna is so adjusted that the full power is received for the greatest distance at the center of the picture, and that is, the portion A in the top center of the picture. Hence, the axis of the receiving antenna is directed to this point. The energy of the points of line B–C and even line D–E is then received with reduced sensitivity. However, since these points are substantially closer, the signal energy reflected by them and striking the receiver is likewise substantially larger than the energy emanating from A. The weaker reception sensitivity exterior to A is compensated by larger reflected powers, which simultaneously prevents objects lying very near on the line D–E from completely blooming the received image.

The deemphasized ranges in both triangles F and G merely play a minor role for landing operations. Nevertheless, strongly reflecting objects disposed at right angles to the impinging radiation will still appear in the picture within these ranges (e.g., buildings) and also at greater distances.

To obtain a good resolution (target discrimination) of the radio observation apparatus, utilizing a return beam, the frequency of the millimeter wave radiation should be selected as high as possble. Due to the atmospheric conditions, however, limits are imposed on the reduction of the wavelength, particularly by taking the precaution that the available microwave power of such a radio observation device designed for use as aircraft equipment does not exceed a magnitude of 50–100 watts CW output power. With the exception of the frequency region around 60 gHz. (strong oxygen absorption), neither the absorption in the air or water vapor nor the increasing scattering on rain drops, snow flakes or hail stones plays an important role when millimeter waves, even down to wavelengths of about 4 mm., are utilized. If an angle of aperture of the lobe of about 0.5° is the objective, a mirror diameter of 1 m. is obtained for an 8 mm. wavelength and a 50 cm. diameter for a 4 mm. wavelength.

In practice, as a compromise between the smaller scattering at 8 mm. and the small diameter of the transmitting parabola at 4 mm., a wavelength of about 6 mm. ($\hat{=}$50 gHz.) preferably is selected.

If, for example, a picture reproduction frequency of 100 Hz. is assumed, maximum differences between the diagonal picture angles of 3 m. arise at the speed of sound of the aircraft. Thus 100 to 150 picture points form one line, with the number of lines being approximately 50, from which a transmission frequency of 1 mHz. is obtained. With a 60 cm. mirror diameter, the lobe has a diameter of 0.5°, and consequently, the angle of view at 100 picture points per line is 50°. The resolution of a half degree means a resolution of 10 m. at a distance of 1 km., and a definition of 1 m. at a distance of 100 m., hence, an accuracy that can be considered sufficient for landing operations of an aircraft.

When a signal is 100% reflected on an obstacle at a distance of 1 km., of 100 w. transmitting power still about 3 $\mu$w. strikes a receiving antenna of 50 cm. diameter. This falls directly within the sensitivity range of detectors for the indicated wavelengths. Hence, a range of several kilometers with an observation device according to the invention can likewise be achieved with the aforementioned transmitting powers.

The oscillation of the signal radiation focused by means of a phased-array arrangment through wobbulation also has an extraordinary advantage for the reception of the return signals. By mixing the received signal with the signal simultaneously transmitted, which is more or less frequency-shifted, depending on the distance of the obstacle on which bearings are taken, and subsequent amplification by an intermediate frequency amplifier, the effect of direct radio interference from the transmitter on the receiving antenna is quantitatively eliminated from the circuit. Moreover, there is the possibility of controlling the brightness of picture in the foreground and background. For this purpose, the frequency response of the intermediate frequency amplifier preferably is so selected that the amplification at the lower-frequency end, which corresponds to the short distances is very low and increases towards the upper-frequency end, for example linearly, or greater. Blooming of the foreground thus can be avoided.

Finally, an apparatus according to the invention offers the possibility of marking certain distances in the television picture by utilizing the intermediate frequency position of the mixed received signal which varies with the distance of the reproduced object, similar to a distance measuring method which likewise employs superposition of the transmitting and receiving impulses. Thus, the pilot's orientation toward the perspective, two-dimensional television picture is made relatively easy.

The following numerical evaluations will serve for a better understanding of the invention:

For the deflection of the lobe, the following equation can be utilized:

$$\sin \alpha=\frac{k\cdot\Delta\alpha}{\frac{\lambda_0}{2}}$$

whereby $k\cdot\lambda_0$ represents the length of a coil of the serpentine configuration (electrical length).

For $\alpha=30°$ $\sin \alpha=\frac{1}{2}$;

For $\alpha=30°$ $\sin \alpha=\frac{1}{2}$;

hence:

$$\Delta\lambda=\frac{\lambda_0}{4k}$$

For $$k=7\Delta\lambda=\frac{\lambda_0}{28}$$

hence for $f_0=50$ gHz. $\Delta f\approx1.79$ gHz.

At the selected wavelength of $\lambda_0=6$ mm., 200 hollow waveguide apertures result for a length of the phased array of 60 cm. Thus, the total electric length of the arrangement, that is, the travel time of a wave from beginning to end of the serpentine-shaped line is:

$$T_p=200.7.\frac{1}{50:10^9}=2.8.10^{-8}\text{ sec.}$$

For a picture frequency of 100 Hz., taken as an example, and a number of lines of 50, the scanning time for a line is arrived at as follows:

$$T_z=\frac{1}{100}\cdot\frac{1}{50}=200\ \mu\text{sec.}$$

Hence, in picture points per line there is required for each picture point $T_z/100=2$ $\mu$sec. In 2 $\mu$seconds an electric wave covers a distance of 600 m., which corresponds to a distance of 300 m. taking the forward and return travel into consideration. If a minimum distance of 6 m. and a maximum distance of 3 km. are considered, the accompanying travel times of the signal are arrived at:

$$T_{min}=4\cdot10^{-8}\text{ sec. and } T_{max}=2\cdot10^{-5}\text{ sec.}$$

With the frequency deviation having a value of approximately $\Delta f=2$ gHz. as previously computed, the required saw tooth wave in the selected example has a length of $T_z=200$ $\mu$seconds. There thus results a slope of 10 mHz./$\mu$sec. and for the intermediate frequency amplifier a band width of 0.4–200 mHz. It is readily apparent that the travel time in the serpentine wave guide of $T=2.8\cdot10^{-8}$ seconds is still below the minimum travel time $T_{min}$. This travel time $T_p$ in the phased-array arrangement results in a lobe, if particular steps are not taken thereagainst, having an angle definition of $4.2\cdot10^{-3}$ degrees, hence a negligible value.

The lateral displacement of an object lying at the maximum distance of 3 km. is $T_{max}=2\cdot10^{-5}$, that is, already 1/10 of the line length or 10 picture point widths. Apart from the fact that this displacement, where landing apparatus is involved, is essential only for the large, not so dangerous distances, the distance measurements indicated by the frequency position of the intermediate frequency amplifier can be utilized as a correction. To that end, a delay line is connected between the video amplifier and picture tube, which line linearly delays inversely with the frequency. As a result, all picture points arrive in the correct position and the travel time effect, which is so important for radar, but which is not here desired, is eliminated.

The actual length of the saw tooth must be about 10% larger than that required by the angle of deflection, which in this case was assumed to be 30°. A picture point in the extreme left or right top corner of the picture could lie at a distance of 3 km. This circumstance is already taken into account in the present embodiment by employing a frequency swing of 2 gHz. instead of the 1.79 gHz. computed for $k=7$.

The invention is not limited to the numerical values and practical examples recited above, particularly, the picture frequency can be selected much lower. Moreover, pauses can be inserted after each line sweep to avoid interference upon full rotation of the rotating mirror.

Changes may be made within the scope and spirit of the appended claims which define what is believed to be new and desired to have protected by Letters Patent.

I claim:

1. A method of effecting radio observation, utilizing a return beam, for rendering objects visible by television transmission, in the form of a millimeter wave signal, particularly for aircraft, wherein the space to be viewed is scanned line by line by a substantially point-shaped source of millimeter radiation in the manner of a television raster, and in which the reflected signals may be used for the production of a picture of the space to be viewed by suitable means customery in television engineering, comprising the steps of strictly monotonically frequency modulating a millimeter wave oscillation with the period of a line duration, radiating said millimeter wave from a plurality of points disposed in a row and spaced on the order of a half wavelength of the signal to be transmitted, with said row disposed on the axis of a parabolic cylindrical antenna, continuously feeding said millimeter wave signal to said radiating points with a phase difference of $2\pi$ or an integral multiple thereof varying with the frequency of the signal, receiving the reflected radiation from objects in the path of the transmitted millimeter wave signal, mixing the same with the simultaneously transmitted signal, and delaying the signal, prior to application to a viewing tube, inversely linearly with the frequency.

2. In an apparatus for radio observation utilizing a return beam for rendering objects visible by television transmission by means of a millimeter wave signal, particularly for aircraft, wherein the space to be viewed, starting from a substantially point-shaped source of millimeter wave radiation, is scanned line by line in the manner of a television raster and the reflected millimeter wave signals are received by a receiving antenna and through viewing means customary in television engineering reproduce a picture of the space to be viewed, in which deflection in the line direction is effected electronically by means of a linear arrangement in the form of a phased-array arrangement consisting of a folded waveguide with the column deflection vertical thereto being effected mechanically, the combination of a strictly monotonically frequency-modulated millimeter wave oscillator operatively connected to such phased array arrangement, an intermediate frequency amplifier connected to the load side of such receiving antenna, and means for mixing in said intermediate amplifier the received signal frequency with the frequency simultaneously transmitted.

3. An apparatus according to claim 2, wherein the diameter of said apertures increases in the direction of travel of the millimeter wave fed therein, whereby, despite the progressive decrease of the wave energy, substantially the same amount of energy is coupled out at each such point of the hollow waveguide.

4. An apparatus according to claim 2, comprising a parabolic cylindrical antenna, a horn radiator disposed to guide the millimeter wave radiation concentrated in one plane from said waveguide, and a rotating mirror arrangement for millimeter waves, disposed in the path of radiation from said horn radiator, operative to guide such radiation toward said parabolic cylindrical antenna.

5. An apparatus according to claim 2, wherein said source of millimeter wave oscillations is constructed to provide a signal having a wavelength of 5–6 mm.

6. An apparatus according to claim 5, wherein a high efficiency resonance backward-wave tube is provided, operative to produce a millimeter wave signal of approximately 50 to 60 gHz., said tube having a resonance quality factor which renders possible a frequency wobbulation of 2 gHz.

7. An apparatus as defined in claim 2, wherein amplification of the intermediate frequency amplifier increases from the lower frequency end to the upper frequency end.

8. An apparatus as defined in claim 2, comprising in further combination, means utilizing the intermediate frequency position of the received signal mixed with the transmitting signal to mark predetermined distances in the television picture.

9. An apparatus as defined in claim 2, comprising in further combination a delay line, which effects a delay inversely linearly with the frequency, operatively connecting the picture tube and the intermediate frequency amplifier.

10. An apparatus as defined in claim 2, wherein said phased array comprises a serpentine waveguide in the form of an elongated rectangular hollow body which is provided with interdigital line-forming partition walls spaced from one another at $\lambda/4$, and a radiation waveguide for radiating the high frequency energy outwardly, having a wall in common with the serpentine waveguide, in which common wall coupling apertures are disposed, said radiation waveguide being subdivided by parallel partition walls respectively centered between each two adjacent rows of coupling apertures.

11. An apparatus according to claim 10, wherein the partition walls of the hollow wave guide means form chambers which are open in a plane extending at right angles to the wall which is in common wtih the serpentine-shaped hollow waveguide.

References Cited

UNITED STATES PATENTS

| | | | |
|---|---|---|---|
| 3,191,170 | 6/1965 | Lustig et al. | 343—5 |
| 3,345,631 | 10/1967 | Chamberlin | 343—100 |

RODNEY D. BENNETT, JR., Primary Examiner

JEFFREY P. MORRIS, Assistant Examiner